UNITED STATES PATENT OFFICE.

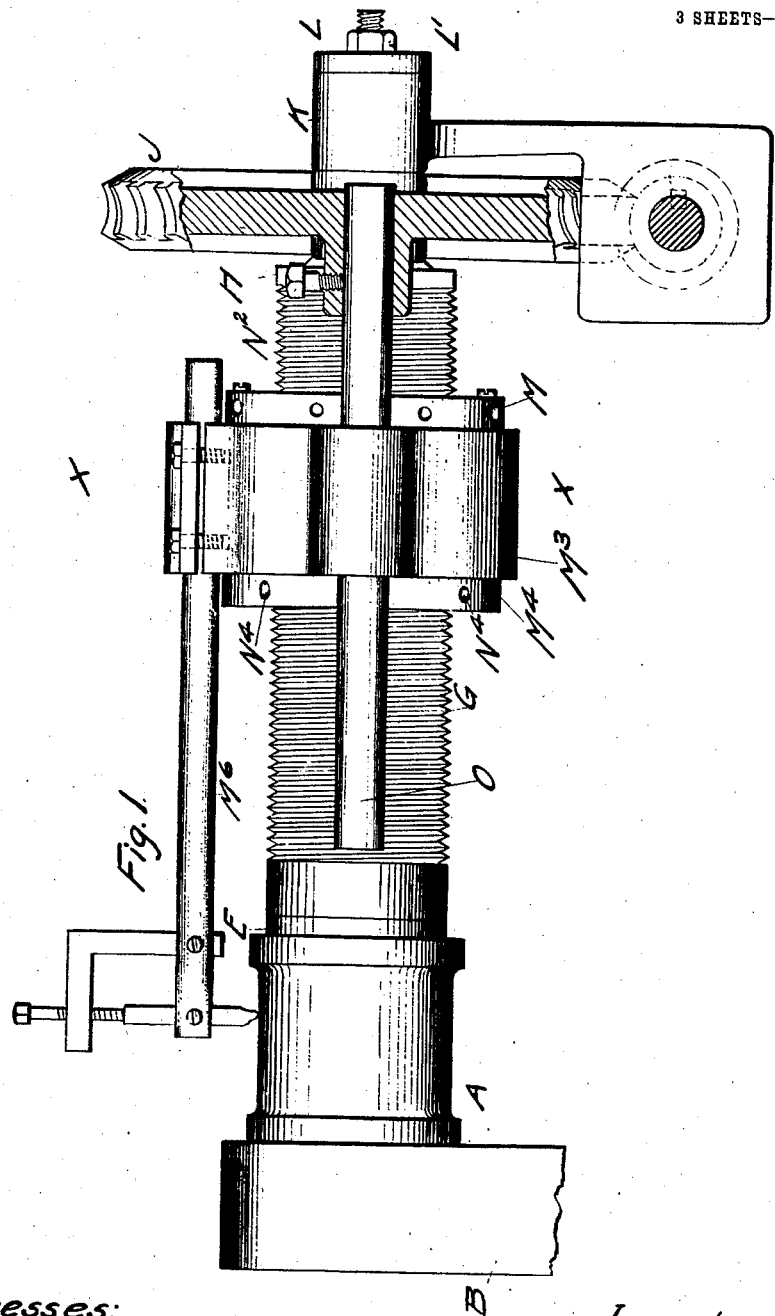

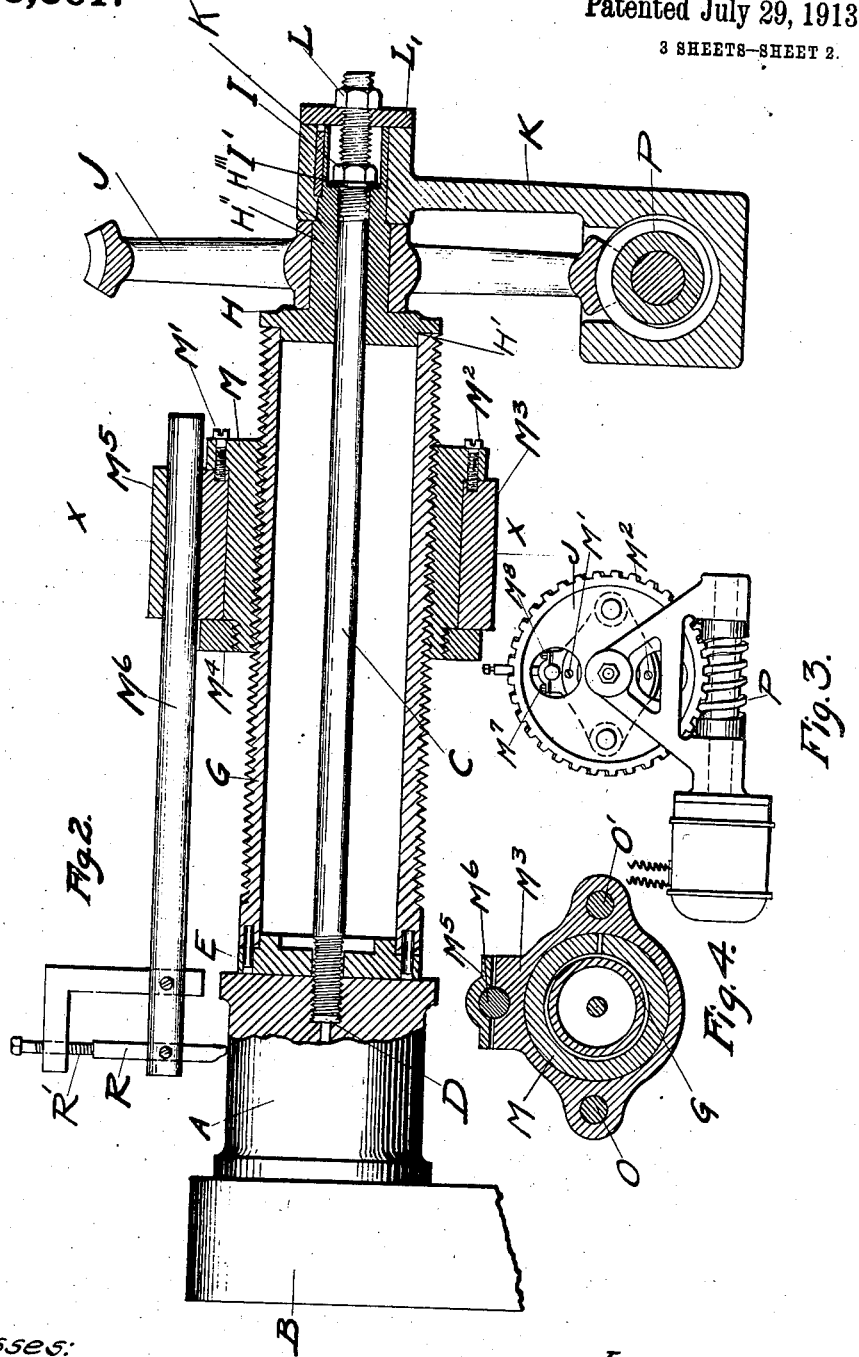
F. T. DERSCH.
MACHINE FOR TURNING OFF CRANK PINS OR LIKE PARTS.
APPLICATION FILED APR. 16, 1909.
1,068,861.
Patented July 29, 1913.
3 SHEETS—SHEET 2.
Witnesses:
Arrigo Young
Arthur O. Nelson
Inventor
Frank T. Dersch.

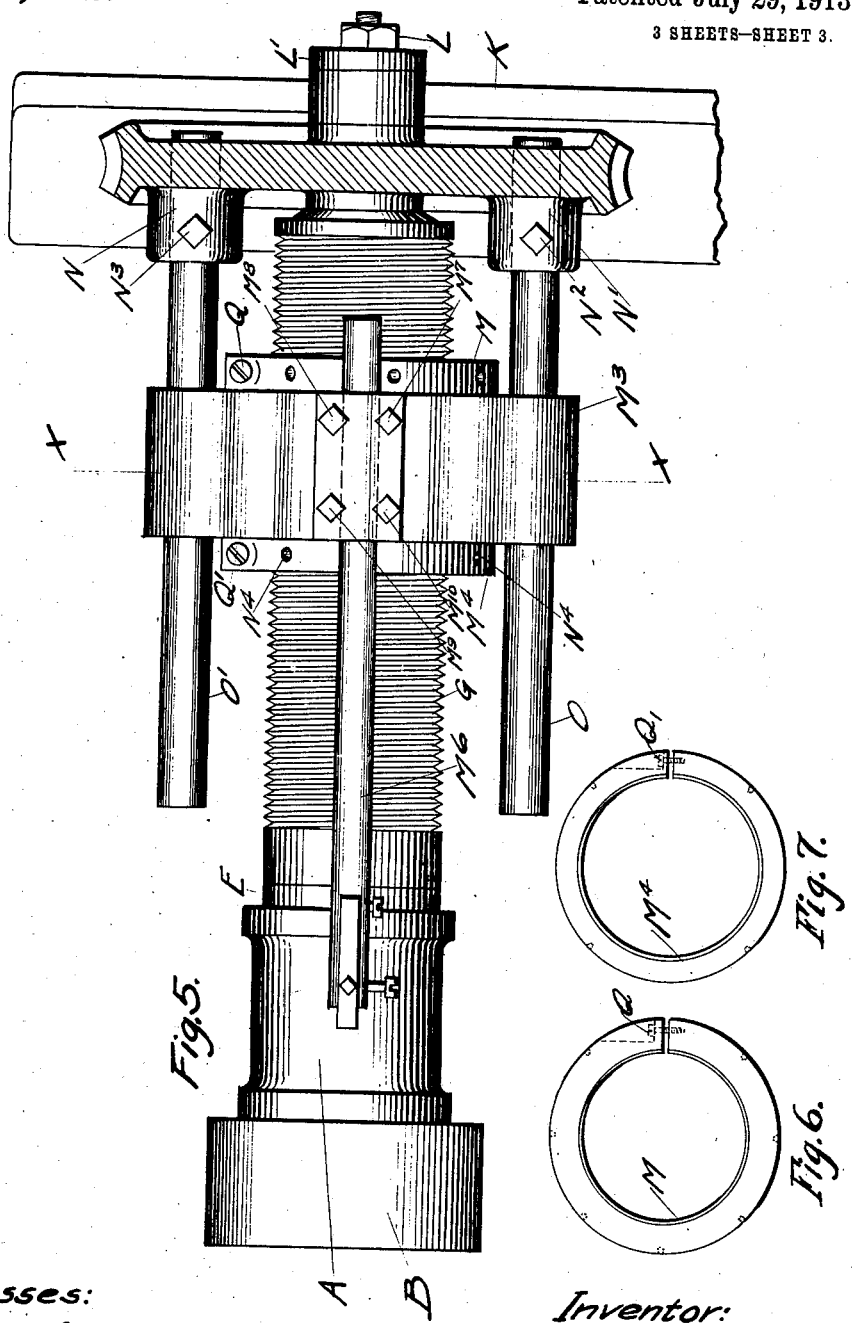

FRANK T. DERSCH, OF CHICAGO, ILLINOIS.

MACHINE FOR TURNING OFF CRANK-PINS OR LIKE PARTS.

1,068,861.  Specification of Letters Patent.  Patented July 29, 1913.

Application filed April 16, 1909. Serial No. 490,342.

*To all whom it may concern:*

Be it known that I, FRANK T. DERSCH, a citizen of the United States, and a resident of Chicago, Cook county, Illinois, have invented certain new and useful Improvements in Machines for Turning Off Crank-Pins or Like Parts, of which the following is a full, clear, and exact specification.

My invention relates to improvements in machines for turning off crank pins and has special reference to those which are adapted for axial attachment to the crank pin and dispense with any support derivable from the crank or the arms of the wheel to which the crank pin is attached or of which it is substantially an integral part.

My invention is primarily an emergency tool and is useful in truing up crank pins which have lost their true cylindrical form through use.

The object of my invention is to provide a new, useful and improved machine for turning crank pins, which machine may be easily applied to or detached from the work.

A further object of my invention is to provide a machine of light construction, increased rigidity and perfect accuracy.

A further object of my invention is to provide a machine of simple and inexpensive construction, whereas the machines generally used are both relatively complicated and expensive.

A further object of my invention is to provide a machine the capacity of which may be readily altered at small expense and in which broken or disabled parts may be replaced or repaired at low cost.

A further object of my invention is to provide a machine which shall be capable of operation in confined or difficultly accessible places.

A further object of my invention is to provide a machine of the character described, of very few moving parts and practically self contained.

A still further object of my invention is to provide a machine for turning crank pins, capable of operation by a motor directly connected to the driving mechanism, or by a motor and flexible shaft connection.

The invention consists in novel features and parts and combinations of the same, which will be more fully described hereinafter and then pointed out in my claims.

One practical embodiment of my invention is represented in the accompanying drawings, forming a part of this specification, in which similar characters of reference indicate corresponding parts in all views.

Figure 1 is a side elevation of the improvement; Fig. 2 is a vertical section of the same at the center line; Fig. 3 is a reduced end view, said end being hereinafter described as the outer end of my invention, in contradistinction to the end abutting the crank pin, hereinafter described as the inner end of the device. Fig. 4 is a reduced vertical section taken on the line X—X of Figs. 1, 2 and 5, the parts beyond the section not shown; Fig. 5 is a plan view, showing the gear wheel in section near its horizontal diameter; Fig. 6 is a view of the split sleeve, M; and Fig. 7 is a view of the split lock nut, $M^4$.

The turning machine is temporarily mounted axially on the crank pin, A, of the crank, B, and the device is made ready for use by introducing the through bolt, C, into the threaded lubricator recess, D, previously centrally disposed in the crank pin. This through bolt, C, constitutes the sole means for the support of the machine and driving motor. The bed abuts the crank pin longitudinally, its inner end being closed as shown by the base, E. This base constitutes a closing device for the bed, G, and by virtue of the fact that said base is faced off perpendicularly to the axis of the bed, the bed may be brought into axial alinement with the crank pin. Bored centrally in the base, E, is a hole which accurately fits the through bolt, C. As shown by the drawings the bed and base are preferably of approximately the diameter of the crank pin.

At the outer end of the hollow cylindrical bed, G, is a journal bushing, H, turned to accurately fit the bed, G, and provided with a shoulder, H', by which means the journal bushing, H, is held in alinement with said bed as shown. The end of the journal bushing, H, is recessed to permit the introduction of the through bolt, C, the nut, I, and washer, I', as shown.

Should it be found that the device is out of true, it may be brought into alinement with the crank pin by introducing thin shims between that face of the base, E, which abuts the crank pin and the end of the crank pin.

Beyond the collar, H', of the journal bushing, H, is a reduced cylindrical section, H'', which constitutes a journal for the worm wheel, J, capable of revolving thereon. Beyond this journal portion, H', which carries the worm wheel, J, is another cylindrical portion, H''', preferably further reduced as shown, which immovably supports the worm hanger, K; and on which said hanger, K, is fixed and held against rotation by a key, K'. Thus the journal bushing, H, is at one and the same time a bearing for the nut, I, and washer, I', a journal for the worm wheel, J, and a fixed support for the worm hanger, K. A plate, L', and a nut, L, on the through bolt, C, coact with a shoulder formed at H''', on the journal bushing, H, to hold the hanger, K, in place longitudinally. The worm wheel, J, a driven member, has suitably disposed in its web, a plurality of bosses, N, and N', bored to receive the arms, O and O', said bosses being provided with set screws, $N^2$ and $N^3$, for securing said arms in place, as illustrated. These arms, O and O', in combination with the worm wheel, J, constitute an actuating member or propelling means which slidably engages the tool carriage in a manner more fully described hereinafter. The bosses, N and N', and the axes of the arms, O and O', are parallel to the main axis of the machine, said main axis being the axis of the cylindrical bed, B, the crank pin, A, the journal bushing, H, and the worm wheel, J, as illustrated. Suitably disposed in the hanger, K, is the worm, P, a motor actuated element, which drives the worm wheel, J, said worm wheel, J, in turn actuating a tool carriage as more fully described hereinafter.

The tubular bed, G, is threaded on its outer surface as shown and is fitted with a sleeve, M. It is obvious that in order to include the feed mechanism in the operating train, the tool carriage proper or tool post carrier must be locked in some manner to the sleeve M, which operates on the tubular bed G. For this purpose the sleeve is threaded to the bed and the thread constitutes a device whereby the sleeve is fed along the bed while rotating, as more fully described hereinafter. Mounted on this sleeve, M, is a tool carrier, $M^3$ secured irrevolubly to the same, except as hereinafter described, by set screws, M' and $M^2$, and held longitudinally by the lock nut, $M^4$. The lock nut, $M^4$, and the sleeve, M, are provided with means for removing the same, preferably a plurality of recesses, $N^4$, for taking a spanner wrench. Both the sleeve, M, and lock nut, $M^4$, are split and are provided with set screws whereby either sleeve or lock nut, or both may be clamped in place. The tool post carrier, $M^3$, is a ring mounted on the sleeve, M, and comprises a plurality of lugs or ears which are suitably bored to receive propelling arms, which project from the worm wheel, J, thereby completing a sliding connection between the said worm wheel, J, and the said tool post carrier. Mounted on this tool post carrier, $M^3$, is the tool post, $M^6$, secured in place by the cap, $M^5$, and a plurality of cap bolts, $M^7$, $M^8$, $M^9$, $M^{10}$. The worm wheel, J, and the propelling arms, O and O', connected therewith and disposed as hereinbefore described, constitute an actuating element slidably engaging the tool carriage proper. Thus the driving connection between the gear wheel, J, and the tool post carrier is established through the arms, O and O', and lugs or ears on the tool post carrier, by which means the movement of the gear is communicated to the tool post carrier. The tool post being fixed in the tool carrier, it is clear that whatever motion is imparted to the carrier will be conferred in like manner on the tool post. The driving mechanism, is composed of motor, hanger, and gearing.

As illustrated in the accompanying drawings my device is operable without other support than that derivable from the rigidity of the bed, and the central stud. The device is especially designed to be used in connection with an electric, pneumatic, or other compact power motor, such as is shown in Fig. 3. If desired the motor may be located at some distance from the device and a flexible shaft connection used to transmit the necessary power to the end of the worm. When the machine is thus ready for use and a suitable tool disposed in or adjusted on the tool post, the power may then be applied to the end of the worm, P. This causes the said worm to revolve in its casing and drive the worm wheel, J, mounted as described, on the journal bushing, H. The arms, O and O', fixed in the worm wheel, J, engage the lugs disposed on the tool carriage proper and cause the same to revolve with the worm wheel. As my device is ordinarily used, the tool carriage proper is in engagement with the threaded sleeve, M, and by this means, a longitudinal feed action takes place simultaneously with the rotation of the tool carriage. The action of the tool carriage is thus similar to that of other turning devices, comprising a fixed bed, and a rotating tool carrier. In order to turn fillets, collars, or parts involving a change in the diameter of the crank pin, A, the threaded sleeve, M, may be clamped on the cylindrical bed, G, by tightening the set screw, Q. The set screws, M' and $M^2$, may then be disengaged from the tool post carrier, $M^3$, and the latter is then free to revolve on the sleeve, M. The tool, R, may then be operated independently of the feed, as by means of the set screw, R'.

Among the advantages peculiar to my invention are the following: The entire machine and attached motor are supported and sustained by the bed. The machine may be applied and made ready for use by the agency of a single bolt. The hollow bed of comparatively large diameter constitutes a means whereby increased rigidity, lightness and accuracy of application are obtained. The machine as a whole consists of very few parts and these chiefly inexpensive. The hollow bed is the only part which need be changed when it is desired to either materially increase or decrease the longitudinal working capacity of the machine. Broken parts can be replaced at small expense. The moving parts are few and the connection between the motive power and the tool is unusually direct. It is readily adaptable to operation by hand.

As various modifications of my invention will readily suggest themselves to one skilled in the art to which this machine appertains, I do not confine my invention to the specific structure herein shown and described.

The machine may be operated entirely by hand if so desired, in a variety of ways, such as removing the motor and applying a crank to the end of the worm, or by removing the motor, hanger and worm and inserting a crank in the worm wheel, or otherwise by providing a crank which may be directly connected to the tool carriage proper.

It is obvious that the machine may be used not only on crank pins, but on any work which involves the peculiar problems which are presented in the turning, truing or finishing of similar parts.

In the accompanying drawings, parts of my invention are shown somewhat exaggerated. The machine is capable of much closer assemblage of parts, than as herein shown, especially with reference to the bed, the gearing and the motor.

Having thus described my invention, I claim as new and desire to secure by Letters Patent:

1. The improvements herein described, comprising a cylindrical threaded bed, means for securing the same in abutment with a crank pin, a threaded sleeve fitted to said bed, means for clamping the sleeve upon the bed, a tool carriage proper revoluble on said sleeve, means for rigidly connecting the sleeve and carriage, a tool post projecting from said carriage, a driver on the outer end of said bed and a propelling arm extending therefrom into engagement with said carriage proper, said driver and carriage being thereby slidably connected, substantially as described.

2. In a machine for turning crank pins, the combination of a hollow threaded cylindrical bed, a threaded tool carriage adapted to turn on said bed, a through bolt, a journal bushing, a gear wheel mounted to turn on said bushing, an arm projecting from the web of said gear wheel, said arm slidably engaging said tool carriage and means for rotating said gear wheel, substantially as described.

3. In a machine for turning crank pins, the combination of a hollow threaded cylindrical bed with a threaded sleeve adapted to turn on said bed, a tool carrier revolubly mounted on said sleeve, means for the longitudinal propulsion of said tool carrier, means for fixing said tool carrier on said sleeve, and means for clamping said sleeve on said bed, substantially as described.

4. In a machine for turning crank pins, the combination of a fixed cylindrical bed, a tool carriage movable on said bed, a through bolt, a journal bushing, said through bolt and said journal bushing co-acting to hold said bed in place, a wheel revolubly mounted on said bushing for actuating said tool carriage and means mounted on the outer end of said bushing for driving said wheel, substantially as described.

5. In a machine of the class described, a supporting member adapted for detachable connection with the center of a crank pin, a threaded cylindrical bed supported on the said member, a hanger fixedly connected with the free end of said member, a worm threaded shaft journaled in said hanger, a driven worm wheel rotatably connected with the bed and meshing with the said shaft, a movable carriage in threaded engagement with the said bed, means connecting the carriage with the worm wheel for the advancement thereof by the latter, and a cutting tool supported by said carriage.

6. In a machine of the class described, a supporting member adapted for detachable connection with the center of a crank pin, a threaded cylindrical bed supported on the said member, a hanger fixedly connected with the free end of said member, a worm threaded shaft journaled in said hanger, a driven worm wheel rotatably connected with the bed and meshing with the said shaft, a movable carriage in threaded engagement with the said bed, means connecting the carriage with the worm wheel for the advancement thereof by the latter, a cutting tool supported by the carriage, driving means connected with said shaft, and means permitting adjustment of the tool relative to the carriage.

7. In a machine of the class described, a supporting member adapted for detachable connection with the center of a crank pin, a threaded cylindrical bed supported on the said member, a hanger fixedly connected with the free end of said member, a worm threaded shaft journaled in said hanger, a driven worm wheel rotatably connected with the bed and meshing with said shaft, a movable carriage in threaded engagement with the said bed, means connecting the carriage with the worm wheel for the advancement thereof by the latter, a cutting tool supported by said carriage, driving means connected with said shaft, means permitting of the adjustment of the tool relative to the carriage, and means permitting the lengthening and shortening of the connections between the carriage and the worm wheel.

8. A machine of the class described comprising a cylindrical bed having an abutment base at one end, in combination with means for securing the same in abutment with the end of a crank pin, a tool carriage mounted on said bed for longitudinal movement thereon, a rotary driven element mounted on the outer end of the bed, means adjustably carried by said driven element and having slidable connection with said carriage whereby the latter may be moved from one end of the bed to the other end, and a driving motor having connection with the first named means and actuating the said driven element.

In testimony whereof, I have hereunto set my hand, this 16th day of March, 1909, in the presence of two subscribing witnesses.

FRANK T. DERSCH

Witnesses:
   CHARLES GILBERT HAWLEY,
   ARRIGO YOUNG.